United States Patent [19]

Lichtin et al.

[11] Patent Number: 4,612,096

[45] Date of Patent: Sep. 16, 1986

[54] METHOD FOR MAKING AMMONIA BY THE REDUCTION OF MOLECULAR NITROGEN

[75] Inventors: Norman N. Lichtin, Newton; Kallambella M. Vijayakumar, Boston, both of Mass.

[73] Assignee: Trustees of Boston University, Boston, Mass.

[21] Appl. No.: 634,332

[22] Filed: Jul. 25, 1984

[51] Int. Cl.[4] .............................................. B01J 19/12
[52] U.S. Cl. ................................. 204/157.46; 423/352
[58] Field of Search .................. 204/157.1 R; 423/352

[56] References Cited

U.S. PATENT DOCUMENTS

| | | | |
|---|---|---|---|
| 2,500,008 | 3/1950 | Richardson | 423/363 |
| 4,113,590 | 9/1978 | Schrauzer et al. | 204/157.1 R |
| 4,427,510 | 1/1984 | Lichtin et al. | 204/157.1 R |
| 4,444,907 | 4/1984 | Ohdan et al. | 502/211 |

FOREIGN PATENT DOCUMENTS 349001  5/1931  United Kingdom ................ 423/396

*Primary Examiner*—John Doll
*Assistant Examiner*—Wayne A. Langel
*Attorney, Agent, or Firm*—David Prashker

[57] ABSTRACT

A novel method of producing ammonia by the reduction of molecular nitrogen is provided using a solid metal oxide catalyst and an organic compound in aqueous medium. Pure gaseous nitrogen or air can be reduced in the dark without using any photoenergy or by a photoassisted reaction which uses solar and/or artificial photoenergy. Substantial yields of ammonia are obtained in the dark without the use of photoenergy while major enhancement in yields is obtained via the photoassisted reaction in comparison to presently known methods.

13 Claims, No Drawings

METHOD FOR MAKING AMMONIA BY THE REDUCTION OF MOLECULAR NITROGEN

FIELD OF THE INVENTION

The invention is concerned with chemical methods of producing ammonia which reduce molecular nitrogen under mild conditions using solar, thermal and/or chemical sources of energy.

BACKGROUND OF THE INVENTION

The world's principal industrial processes for fixing atmospheric nitrogen are the Haber-Bosch process and similar methodologies which combine molecular nitrogen with molecular hydrogen over solid catalysts at high temperatures and pressures. These processes require relatively large amounts of energy, are technically sophisticated, and are primarily based on the use of fossil fuels (for instance, natural gas) as the source of hydrogen. By their very nature and chemical requirements, such methodologies are appropriate only for economies of large scale which can provide the ingredients in volume, the central production facilities, and the requisite distribution systems for effective use of the process.

Alternatives to large scale industrial methods for production of ammonia have been sought with the result that considerable chemical research has been directed towards finding economically viable and less energy-consuming methods. One approach has been the use of metal oxide catalysts and the use of gaseous nitrogen from the air. Exemplifying this approach is U.S. Pat. No. 2,500,008 which describes the synthesis of ammonia from hydrogen and nitrogen which are combined with a finely divided iron oxide catalyst and subjected subsequently to ultrasonic vibrations. Another approach uses catalytic processes which synthesize ammonia from nitrogen and water without the use of elemental hydrogen using various wavelengths of photoenergy. Consistent with these developments is the use of solar energy in various forms as the sole energy source and the use of water almost exclusively as the reducing agent. Exemplifying the latter approaches and developments are the following: "Photolysis of Water and Photoreduction of Nitrogen on Titanium Dioxide", *Journal of the American Chemical Society*, 99:7189-7193 (1977) which describes the photoreduction of nitrogen to ammonia using titanium dioxide alone or when doped with iron, cobalt, molybdenum or nickel, or iron oxide alone; U.S. Pat. No. 4,113,590 which describes the synthesis of ammonia and hydrazine by reduction of gaseous nitrogen with water using metal oxide catalysts under the influence of ultraviolet light; and U.S. Pat. No. 4,427,510 which describes the synthesis of nitrogen-containing compounds by combining metal oxide compounds with gaseous nitrogen, a reducing agent such as water, and a source of light whose wavelengths are in the visible range provided by sunlight or artificial light.

A net result of the advances described within these publications (and the other references cited therein) has been the recognition and acceptance of several points as basic teachings in this art. These are: first, in any photocatalytic process using a metal oxide catalyst for the reduction of molecular nitrogen, no measurable reduction of nitrogen occurs without some incident light energy being added to the reaction mixture. Second, water has been the almost exclusive and unquestionably preferred reducing agent; although other reducing agents have been incidentally mentioned in the literature, there is no indication of any kind that these other agents are in any way equal to, much less superior to, water in photocatalytic processes. Third, the yields of ammonia (and other nitrogen-containing compounds) using photocatalytic processes now known in the art are notably small. Given these generally applicable axioms of this art, it will be apparent to one ordinarily skilled in this art that a process for reducing gaseous nitrogen to ammonia using a solid metal oxide catalyst which does not require the use of photoenergy and which provides substantial increases in ammonia yield when using photoenergy, constitutes a major improvement and advancement in this field.

SUMMARY OF THE INVENTION

A method for making ammonia by the reduction of gaseous nitrogen is provided comprising the step of: combining a solid metal oxide catalyst with nitrogen and an aqueous preparation of an organic compound as a reaction mixture. This method is suitable for use in the dark and yields ammonia without the addition of photoenergy from any source. Preferably, however, photoenergy from the sun and/or artificial sources is added to the reaction mixture which results in enhanced yields of ammonia substantially above those from presently known methodologies.

DETAILED DESCRIPTION OF THE PREFERRED EMBODIMENTS

The present invention is a catalytic process which reduces molecular nitrogen to synthesize ammonia. The invention combines finely divided solid metal oxide catalysts with molecular nitrogen in pure gaseous form or as air with a wide variety of organic compounds in the absence or the presence of photoenergy. As used herein, photoenergy is defined as electromagnetic radiation of any wavelength. The present methodology is unique in that significant quantities of ammonia are obtained in the absence of photoenergy when aqueous preparations of organic compounds are present in the reaction mixture. When incident photoenergy is added, there is substantial enhancement of ammonia yields per Einstein of incident energy above those obtainable by presently known processes which do not utilize organic compounds. The reaction may be conducted continuously over entire twenty-four hour periods cyclically using solar energy and/or artificial sources of photoenergy for maximum yield of ammonia for part of the day followed by production of substantial but smaller yields in the dark. By so doing, the photoassisted reaction and the reaction in the dark synthesize ammonia in a continuous, abundant, and regular manner.

The methodology comprising the present invention may be performed in any appropriate apparatus or housing such as a pyrex glass cell. In all instances a source of molecular nitrogen must be provided, such as pure gaseous nitrogen or air, which has access to the metal oxide catalyst and the aqueous preparation of organic compound within the glass cell or other housing. The system variables including the period of reaction, the wavelength limits of incident photoenergy, the temperature, the amount of catalyst, the flow-rate of gaseous reactants, the amount of water, and the amount of added organic compounds are all matters of choice known in the art and may be selected to meet the user's individual requirements or convenience. A number of compounds useful as catalysts in this methodology are known in the art. They include CoO, Co$_3$O$_4$, Cr$_2$O$_3$, —Fe$_2$O$_3$, MoO$_3$, Nd$_2$O$_3$, PbO, Pr$_6$O$_{11}$, TeO$_2$, WO$_3$, La-Fe-oxide, La-Ti-oxide, Sr-Ti-oxide, Co-Mo-Ti-oxide, Pt-La-Ni-oxide, Pt-Sr-Ti-oxide, Zn-Fe-oxide, and TiO$_2$. The metal oxides used in the present process can be selected individually from those listed above or used in combination. The oxide catalyst may be used without any preconditioning or, optionally may be treated to increase its activity. If the metal oxide is pretreated, the oxide may be exposed to nitrogen, air, helium, argon, hydrogen, oxygen, or a vacuum, or any combination of these for 1–48 hours at 20°–600° C. Examples of methods for use and preconditioning of catalysts are described within U.S. Pat. Nos. 4,427,510 and 4,113,590.

The solid catalyst selected is preferably used in a subdivided form such as a fine powder in order to expose a larger surface to the nitrogen for reaction. It is preferred, albeit not absolutely necessary, that the solid catalyst be dispersed in an aqueous liquid carrier to promote maximum contact and reaction between the catalyst and the nitrogen to be reduced. The preferred liquid carrier is bulk water which may have salts or other materials dissolved therein.

The organic compounds useful in this methodology comprise a broad range of compositions which may be used in any desired concentration. It will be appreciated that the optimum quantity of organics for maximum yield of ammonia will vary with the scale of the process and with the specific organic compound(s) selected for use. On a laboratory scale, a useful working range from 15 micrograms (hereinafter "$\mu$g") to 1.0 gram is demonstrated by the data enclosed herewith. The choice of organic compositions suitable in this process includes, but is not limited to, the following: hydrocarbons, aliphatic alcohols, polyols, esters, aldehydes, carboxylic acids, simple and complex carbohydrates including glucose (and its related isomers), cellobiose, maltose, cellulose, starch, chitin, disaccharides, oligosaccharides and polysaccharides in general. In some instances mixtures of two or more compounds may be used advantageously. Moreover, the organic compositions may be utilized in the form of pure compounds, or as naturally occurring mixtures such as vegetable matter exemplified by agricultural or forest wastes, or as industrial waste compositions.

In addition, while it is expected that aqueous preparations of the organic compositions will be used in practicing the method described herein, such aqueous preparations may contain only a minimum of water or may take the form of solutions, colloids, suspensions, or slurries Furthermore, while the method may be used at ambient temperatures and pressures, it is preferably carried out at one atmosphere and at a temperature from about 20° C. to about 60° C. If desired, however, the temperature and pressure ranges can be extended in individual circumstances to produce optimum yields of ammonia.

In the examples which follow, the improved process was carried out in a thermostatically controlled pyrex glass cell containing the solid metal oxide catalyst suspension which was illuminated when required using a 150 watt xenon lamp or 250 watt quartz-halogen lamp placed approximately 30 centimeters from the reaction cell. Photoenergy was transmitted through a 250 or 420 nm cutoff filter which removed shorter wavelengths. With the 420 nm filter, incident light flux was approximately 4 kJ/hr with the Xe lamp and 12 kJ/hr with the quartz-halogen lamp. Reaction times varied from nine to forty hours and temperatures varied from 28° C. to 60° as indicated. Pure gaseous nitrogen or air was passed through the reaction cell at a rate of 0–300 milliliters per minute (hereinafter ml/min) with 60–100 ml/min being preferred. Product ammonia in the effluent gas was trapped in mildly acidified ice-cold water. Yields of ammonia were measured using Nesslers' and/or the trichloramine method of analysis.

The solid metal oxide catalysts were prepared and preconditioned as previously described in the art in one of three ways:

a. An aliquot of finely divided catalyst was treated with nitrogen or argon or helium at temperatures of 30°–500° C. at a rate of 0–500 ml/min for 1–24 hours with subsequent cooling.

b. An aliquot of finely divided catalyst was treated with air or oxygen at temperatures of 30°–500° C. for 2–24 hours at a flow rate of 10–500 ml/min and allowed to cool. This preparation was then treated with mixtures of air or pure oxygen and hydrogen at temperatures of 30°–500° C. and then with hydrogen alone for 1–24 hours at a rate of 10–500 ml/min. The preparation was allowed to cool and subsequently treated with water.

c. The preparation was made as described in subparagraph b but omitting the final treatment with water. Instead, the cooled preparation was treated with mixtures of hydrogen and air or oxygen in combination and then with either air or oxygen alone for a period of four hours as the final step.

EXAMPLE 1

An initial comparison of ammonia yields obtained using $\alpha$—Fe$_2$O$_3$ and several different compounds—formaldehyde, methanol, glycerol, glucose and cellulose—in the absence and presence of photoenergy is provided by the data shown in Table I. It will be noted that the prior art methodology is compared in that water without any organic compound whatsoever was tested under comparable conditions to provide suitable control data.

TABLE I

| Gas | Organic Compound | Wts. in Grams of | | | Lamp Used At >420 nm | Temp (°C.) | Reaction Time (Hrs) | Yield of NH$_3$ (micromoles) |
| --- | --- | --- | --- | --- | --- | --- | --- | --- |
| | | $\alpha$-Fe$_2$O$_3$ | Org. | H$_2$O | | | | |
| N$_2$ | None | .03 | — | 30 | Xe | 30 | 12 | 0.9 |
| N$_2$ | None | .03 | — | 30 | dark | 30 | 12 | 0.00 |
| N$_2$ | None | .05 | — | 30 | Quartz-Hal | 50 | 30 | 1.7 |
| N$_2$ | None | .05 | — | 30 | dark | 50 | 30 | 0.00 |
| N$_2$ | CH$_2$O | .03 | .000015 | 30 | Xe | 30 | 9 | 2.1 |
| N$_2$ | CH$_2$O | .03 | .000045 | 30 | Xe | 30 | 16 | 4.9 |
| N$_2$ | CH$_2$O | .03 | .000075 | 30 | Xe | 30 | 16 | 6.9 |
| N$_2$ | CH$_2$O | .03 | .00030 | 30 | Xe | 30 | 16 | 8.6 |
| N$_2$ | CH$_2$O | .03 | .000075 | 30 | dark | 30 | 15 | 3.9 |

TABLE I-continued

| Gas | Organic Compound | Wts. in Grams of α-Fe₂O₃ | Org. | H₂O | Lamp Used At (>420 nm) | Temp (°C.) | Reaction Time (Hrs) | Yield of NH₃ (micromoles) |
|---|---|---|---|---|---|---|---|---|
| Air | CH₂O | .03 | .000075 | 30 | Xe | 30 | 15 | 4.6 |
| Air | CH₂O | .03 | .000075 | 30 | dark | 30 | 15 | 2.7 |
| N₂ | CH₃OH | .03 | .000032 | 30 | Xe | 30 | 16 | 3.1 |
| N₂ | CH₃OH | .03 | .00032 | 30 | Xe | 30 | 16 | 7.5 |
| N₂ | CH₃OH | .03 | .000032 | 30 | dark | 30 | 15 | 1.8 |
| Air | CH₃OH | .03 | .000032 | 30 | Xe | 30 | 16 | 2.5 |
| Air | CH₃OH | .03 | .000032 | 30 | dark | 30 | 15 | 1.1 |
| N₂ | glycerol | .03 | .0092 | 30 | Quartz-Hal | 30 | 16 | 1.2 |
| N₂ | glycerol | .03 | .0092 | 30 | Quartz-Hal | 50 | 16 | 1.8 |
| N₂ | glycerol | .60 | .92 | 600 | Quartz-Hal | 30 | 16 | 14.1 |
| N₂ | glycerol | .60 | .92 | 600 | Quartz-Hal | 50 | 16 | 26.6 |
| N₂ | glycerol | .03 | .0092 | 30 | dark | 30 | 16 | 0.3 |
| N₂ | glycerol | .60 | .92 | 600 | dark | 30 | 16 | 6.1 |
| Air | glycerol | .03 | .0092 | 30 | Quartz-Hal | 30 | 16 | 1.1 |
| Air | glycerol | .03 | .0092 | 30 | dark | 30 | 16 | 0.2 |
| N₂ | glucose | .03 | .0054 | 30 | Xe | 28 | 24 | 2.4 |
| N₂ | glucose | .03 | .0054 | 30 | dark | 28 | 24 | 1.5 |
| N₂ | glucose | .03 | .400 | 50 | Xe | 35 | 20 | 3.3 |
| N₂ | glucose | .03 | .0036 | 30 | Xe | 50 | 40 | 5.3 |
| N₂ | glucose | .03 | .0054 | 30 | dark | 50 | 24 | 0.5 |
| N₂ | glucose | .03 | .0009 | 30 | Xe | 60 | 26 | 1.2 |
| N₂ | glucose | .03 | .0018 | 30 | Xe | 60 | 20 | 2.0 |
| N₂ | glucose | .03 | .0018 | 30 | dark | 60 | 24 | 0.2 |
| N₂ | glucose | .03 | .0054 | 30 | Xe | 60 | 34 | 8.3 |
| N₂ | glucose | .03 | .0054 | 30 | dark | 60 | 24 | 0.3 |
| Air | glucose | .03 | 0.005 | 50 | Xe | 35 | 19 | 2.76 |
| Air | glucose | .03 | .400 | 50 | Xe | 35 | 20 | 3.7 |
| Air | glucose | .03 | .400 | 50 | dark | 35 | 20 | 1.0 |
| Air | glucose | .03 | .400 | 50 | Xe | 55 | 16 | 8.1 |
| Air | glucose | .03 | .400 | 50 | dark | 55 | 16 | 1.6 |
| N₂ | cellulose | .05 | .100 | 30 | Quartz-Hal | 50 | 30 | 3.6 |
| N₂ | cellulose | .05 | .100 | 30 | dark | 50 | 30 | 0.06 |
| N₂ | cellulose | .10 | .100 | 30 | Quartz-Hal | 50 | 26 | 4.3 |
| N₂ | cellulose | .10 | .100 | 30 | dark | 50 | 30 | 0.08 |
| N₂ | cellulose | .10 | 1.00 | 600 | Quartz-Hal | 50 | 24 | 7.1 |
| N₂ | cellulose | .30 | 1.00 | 600 | Quartz-Hal | 50 | 24 | 16.8 |
| N₂ | cellulose | 1.0 | 1.00 | 700 | Quartz-Hal | 50 | 23 | 24.2 |
| Air | cellulose | .10 | .100 | 50 | Quartz-Hal | 50 | 24 | 3.5 |
| Air | cellulose | .10 | .300 | 600 | Quartz-Hal | 50 | 30 | 8.1 |
| Air | cellulose | .10 | .100 | 50 | dark | 50 | 30 | 0.06 |

Several conclusions are apparent from this data. First, the use of water alone without any organic compound in the reaction mixture produces no ammonia in the absence of photoenergy; it is only when photoenergy is added that some nitrogen is reduced to ammonia. Second, ammonia is produced both in the dark and under exposure to photoenergy when mixtures of catalyst, water and either formaldehyde, methanol, glycerol, glucose or cellulose are contacted with pure gaseous nitrogen or air. Third, in all instances where an organic compound is present, greater yields of ammonia are obtained on exposure to photoenergy. Fourth, ammonia yields are increased when larger quantities of organic material are used. Fifth, the yield of ammonia obtained from mixtures containing organic materials exposed to photoenergy increases with increasing temperature. Sixth, much higher yields of ammonia are obtained from mixtures of organic materials and water than from water alone without any organic material being present. Other relationships between yields and reaction conditions are also apparent to one skilled in the art from the data of Table I.

EXAMPLE 2

A comparison of ammonia yields using glycerol and cellulose in the presence of several different catalysts—TiO₂, platinized Sr-Ti-oxide, Zn-Fe-oxide and Co-Mo-Ti-oxide—in the absence and presence of photoenergy was undertaken, the results being represented by the data in Table II. These catalysts, all of which absorb energy at shorter wavelengths than α—Fe₂O₃, were exposed to photoenergy at wavelengths as short as 250 nm.

The data demonstrates that yields of ammonia obtained in the dark and in the presence of photoenergy using TiO₂, Pt-Sr-Ti-oxide and Zn-Fe-oxide as catalysts are comparable or superior to those yields obtained with α—Fe₂O₃ when using either glycerol or cellulose as one organic compound.

TABLE II

| Gas | Catalyst | Organic Compound | Wts. in Grams of Cat. | Org. | HO | Lamp (At >250 nm) | Temp (°C.) | Reaction Time (Hrs) | Yield of NH₃ (micromoles) |
|---|---|---|---|---|---|---|---|---|---|
| N₂ | TiO₂ | glycerol | .03 | .0092 | 30 | Xe | 50 | 12 | 8.6 |
| N₂ | TiO₂ | glycerol | .03 | .0092 | 30 | dark | 50 | 12 | 1.3 |
| Air | TiO₂ | glycerol | .03 | .0092 | 30 | Xe | 30 | 11 | 3.3 |
| Air | TiO₂ | glycerol | .03 | .0092 | 30 | dark | 30 | 12 | 1.4 |
| N₂ | TiO₂ | cellulose | .05 | .100 | 30 | Xe | 50 | 20 | 5.3 |

TABLE II-continued

| Gas | Catalyst | Organic Compound | Wts. in Grams of Cat. | Wts. in Grams of Org. | Wts. in Grams of HO | Lamp (At >250 nm) | Temp (°C.) | Reaction Time (Hrs) | Yield of NH₃ (micromoles) |
|---|---|---|---|---|---|---|---|---|---|
| N₂ | TiO₂ | cellulose | .05 | .100 | 30 | dark | 50 | 26 | 1.2 |
| Air | TiO₂ | cellulose | .03 | .100 | 30 | Xe | 51 | 19 | 4.9 |
| Air | TiO₂ | cellulose | .03 | .100 | 30 | dark | 51 | 19 | 1.2 |
| N₂ | Pt—Sr—Ti—oxide | glycerol | .05 | .0092 | 30 | Xe | 30 | 20 | 10.0 |
| N₂ | Pt—Sr—Ti—oxide | glycerol | .05 | .0092 | 30 | dark | 30 | 36 | 5.2 |
| Air | Pt—Sr—Ti—oxide | glycerol | .05 | .0092 | 30 | Xe | 30 | 12 | 6.9 |
| Air | Pt—Sr—Ti—oxide | glycerol | .05 | .0092 | 30 | dark | 30 | 12 | 2.8 |
| N₂ | Pt—Sr—Ti—oxide | cellulose | .05 | .100 | 30 | Xe | 50 | 15 | 12.0 |
| N₂ | Pt—Sr—Ti—oxide | cellulose | .05 | .100 | 30 | dark | 50 | 20 | 3.1 |
| Air | Pt—Sr—Ti—oxide | cellulose | .05 | .100 | 30 | Xe | 51 | 15 | 4.9 |
| Air | Pt—Sr—Ti—oxide | cellulose | .05 | .100 | 30 | dark | 51 | 16 | 1.7 |
| Air | Zn—Fe—oxide | cellulose | .05 | .100 | 30 | Xe | 51 | 19 | 4.4 |
| Air | Zn—Fe—oxide | cellulose | .05 | .100 | 30 | dark | 50 | 20 | 1.8 |
| N₂ | Pt—La—Ni—oxide | cellulose | .05 | .100 | 30 | Quartz-Hal | 50 | 24 | 2.1 |
| Air | Co—Mo—Ti—oxide | glycerol | .05 | .0092 | 30 | Xe | 30 | 12 | 1.3 |

The invention is not to be restricted in form nor limited in scope except by the claims appended hereto.

What we claim is:

1. A method for making ammonia by the reduction of molecular nitrogen comprising the steps of:
combining a metal oxide catalyst with molecular nitrogen and an aqueous preparation of an organic compound as a reaction mixture at a temperature not more than 60° C.;
and adding photoenergy to said reaction mixture.

2. The method for making ammonia as recited in claim 1 wherein said organic compound is glucose.

3. The method for making ammonia as recited in claim 1 wherein said organic compound is cellulose.

4. The method for making ammonia as recited in claim 1 wherein said organic compound is glycerol.

5. The method for making ammonia as recited in claim 1 wherein said organic compound is selected from the group consisting of hydrocarbons, alcohols, aldehydes, polyols, and carboxylic acids.

6. The method for making ammonia as recited in claim 1 wherein said organic compound is selected from the group consisting of monosaccharides, disaccharides and polysaccharides.

7. The method for making ammonia as recited in claim 1 wherein said organic compound is selected from the group consisting of agricultural material, forest material and waste material.

8. The method for making ammonia as recited in claim 1 wherein said photoenergy is light energy.

9. The method for making ammonia as recited in claim 1 wherein said photoenergy has a wavelength in the visible range of light.

10. The method for making ammonia as recited in claim 1 further comprising adding thermal energy to said reaction mixture.

11. The method for making ammonia as recited in claim 1 wherein said nitrogen is in the form of air.

12. The method for making ammonia as recited in claim 1 wherein said metal oxide catalyst is selected from the group consisting of —Fe₂O₃, TiO₂, Pt-Sr-Ti-oxide, Sr-Ti-oxide, Co-Mo-Ti-oxide, Zn-Fe-oxide, and Pt-La-Ni-oxide.

13. The method for making ammonia as recited in claim 1 wherein said organic compound comprises vegetable matter.

* * * * *